(12) United States Patent
Iwashita

(10) Patent No.: US 9,367,261 B2
(45) Date of Patent: Jun. 14, 2016

(54) COMPUTER SYSTEM, DATA MANAGEMENT METHOD AND DATA MANAGEMENT PROGRAM

(75) Inventor: Masaru Iwashita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 123 days.

(21) Appl. No.: 14/110,343

(22) PCT Filed: Sep. 28, 2011

(86) PCT No.: PCT/JP2011/072164
§ 371 (c)(1),
(2), (4) Date: Oct. 7, 2013

(87) PCT Pub. No.: WO2013/046352
PCT Pub. Date: Apr. 4, 2013

(65) Prior Publication Data
US 2014/0059315 A1 Feb. 27, 2014

(51) Int. Cl.
*G06F 12/00* (2006.01)
*G06F 3/06* (2006.01)
*G06F 11/20* (2006.01)
*G06F 17/30* (2006.01)

(52) U.S. Cl.
CPC ............... *G06F 3/065* (2013.01); *G06F 3/067* (2013.01); *G06F 3/0619* (2013.01); *G06F 11/2094* (2013.01); *G06F 11/2097* (2013.01); *G06F 17/30575* (2013.01)

(58) Field of Classification Search
CPC . G06F 17/30215; G06F 3/0619; G06F 3/062; G06F 3/065; G06F 3/067; G06F 11/2094; G06F 11/2097; G06F 17/30575; H04L 67/1002
USPC ......................................... 711/162, 165, 114
See application file for complete search history.

(56) References Cited

U.S. PATENT DOCUMENTS

| 7,143,082 | B2 | 11/2006 | Kamimura et al. |
| 8,332,361 | B2 * | 12/2012 | Suzuki ................. G06F 11/2058 711/162 |
| 8,572,031 | B2 * | 10/2013 | Merriman et al. ............ 707/613 |

(Continued)

FOREIGN PATENT DOCUMENTS

| JP | 2002-297432 A | 10/2002 |
| JP | 2009-545072 A | 12/2009 |

(Continued)

OTHER PUBLICATIONS

Jun Miyazaki, "Cloud o Sasaeru Data Storage Gijutsu", Joho Shori, May 15, 2011, vol. 52, No. 6, pp. 684 to 692.

*Primary Examiner* — Pierre-Michel Bataille
(74) *Attorney, Agent, or Firm* — Volpe and Koenig, P.C.

(57) ABSTRACT

A computer system is achieved which enables a high-speed response to a copy process between computers configuring a KVS (Key Value Store) and ensures data reliability. Disclosed is a computer system in which computers are connected via a network, and a task is executed using a database including storage areas belonging to the computers. The computer system includes a first computer that manages a data set containing pieces of data. The first computer stores replicated data of data contained in data sets managed by other computers. Upon receiving a request for storage (writing and/or overwriting) of new data, the first computer stores the data in memory, replicating the data, transmits the replicated data to the other computers, determines whether the replicated data has been transmitted to the network, and uses the data to execute the task when determining the replicated data was transmitted to the network.

16 Claims, 11 Drawing Sheets

(56) References Cited

U.S. PATENT DOCUMENTS

2010/0131468 A1    5/2010    Thakore
2012/0173673 A1*   7/2012    Dietrich et al. ............... 709/218

FOREIGN PATENT DOCUMENTS

| | | |
|---|---|---|
| JP | 2010-129088 A | 6/2010 |
| WO | 2008/014062 A2 | 1/2008 |

* cited by examiner

| ID | Key | Value | MAIN REPLICATION DESTINATION | SUB REPLICATION DESTINATION |
|---|---|---|---|---|
| 1 | key 1 | value 1-1 | success | success |
| 2 | key 2 | value 2-1 | fail | success |
| 3 | key 3 | value 1-2 | success | fail |
| 4 | key4 | value 3-1 | success | success |
| ⋮ | ⋮ | ⋮ | ⋮ | ⋮ |

COMPUTER SYSTEM, DATA MANAGEMENT METHOD AND DATA MANAGEMENT PROGRAM

BACKGROUND

The present invention relates to a distributed database including a plurality of computers and particularly to a replication process of distributed data.

In recent years, the amount of data has explosively increased in computing systems which execute an application using the Web and computer systems including a NoSQL (Not Only Structured Query Language) database such as KVS (Key Value Store) have been in widespread use. At present, such systems are introduced to various enterprise systems and further utilization in the future is expected.

In a KVS, various configurations are adopted such as a configuration for storing data in a volatile storage medium enabling high-speed access to data, e.g. a memory, a configuration for storing data in a nonvolatile storage medium with excellent data storage durability such as an SSD (Solid State Drive) or an HDD(Hard Disk Drvice), and a configuration as a combination of these. In a combinational configuration, a balance of a memory store configured by virtually integrating memories of a plurality of computers and a disk store configured by nonvolatile storage medium/media of one or more computers can be variously changed according to various operating policies such as an emphasis on high-speed accessibility and an emphasis on storability.

Data as a pair of data (value) and an identifier (key) of the data is stored in the memory store and the disk store.

Further, in the KVS, a cluster is composed of a plurality of servers, and a parallel processing is realized by distributing data in the servers included in that cluster. Specifically, data is stored in each server for each range of a key (key range). Each server performs a processing as a master of the data included in the key range in charge. Specifically, in response to a read request including a predetermined key, the server in charge of the data in the key range including that key reads data corresponding to the key.

Accordingly, in the KVS, the performance of the parallel processing can be improved by scaling out.

It should be noted that the cluster is configured by connecting the servers in a ring and a unique identification number is assigned to each server. Further, various methods such as a consistent hashing method, a range method and a list method are used as a data arrangement method for each server.

The consistent hashing method is described as a representative. In the consistent hashing method, a hash value corresponding to a key is calculated, and a remainder of the division of the calculated hash value by the number of the servers is calculated. Data is arranged in the server with an identification number matching that remainder.

Some of KVSs are known to be so configured that replicated data of data managed by other servers is stored in servers constituting a cluster due to a requirement to ensure data reliability. Specifically, each server is a master for managing data included in a predetermined key range and, simultaneously, a slave for holding replicated data of data managed by the other servers. In this way, even if a failure occurs in a server, the other server as a slave can become a master for the data managed by the failed server as a master by upgrading replicated data held thereby and the processing can be continued.

It should be noted that the server that is a master is also written as a master server and the server that is a slave is also written as a slave server below.

As described above, the servers constituting the KVS have no single point of failure because of the absence of a special server such as a management server. Specifically, since the other server can continue the processing even if a failure occurs in an arbitrary server, the computer system is not stopped. Thus, the KVS is ensured to have fault tolerance.

It should be noted that the number of the slave servers, i.e. the number of the servers that become storage destinations of replicated data can be arbitrarily set by the computer system.

Cost for the replication processing (replication) for storing replicated data in the slave servers is high. Specifically, if it is waited until the replicated data is stored in all the slave servers to ensure data reliability, a waiting time of the processing occurs and the speeding-up of the processing in response to a request cannot be realized. Thus, it is recommended to perform the replication processing in asynchronization with a request such as the one for a data reading processing.

However, if the processing is continued without waiting for the completion of the replication processing, there is a risk of losing data if a failure occurs in the master server before the replication processing is completed, and data reliability cannot be ensured.

The following methods are, for example, known in conventional replication processings.

A first method is as follows. When receiving a request for a storage processing from a client or the like, a master server stores data in a memory store or a disk store. Thereafter, the master server notifies the completion of a replication processing to the client or the like as a storage processing requester (without making a replication processing request to slave servers). Thereafter, the replication processing of data requested to be written is requested to the slave servers (replication processing by asynchronization). Although a request can be processed at a high speed in the first method, data reliability is low since the storage processing of the replicated data in the slave servers is not completed.

A second method is as follows. When receiving a request for a storage processing, a master server stores data in a memory store or a disk store. The master server transmits replicated data to one slave server. When receiving a completion notification of the storage processing of the replicated data from the one slave server, the master server notifies the completion of the replication processing to a computer as a requester (replication processing by synchronization). Since replicated data is stored in one slave server in the second method, data reliability is higher than in the first method. However, since a response from the slave server is waited for, processing performance in response to a request is lower than in the first method. Further, in the second method, there is a risk of losing data when a double failure occurs.

A third method is as follows. When receiving a request for a storage processing from a client device, a master server stores data in a memory store or a disk store. The master server transmits replicated data to all the slave servers. When receiving a notification of the completion of the storage processing of the replicated data from all the slave servers, the master server notifies the completion of the replication processing to the computer as a requester (replication processing by synchronization). Since replicated data is stored in all the slave servers in the third method, data reliability is highest. However, since responses from all the slave servers are waited for, processing performance in response to a request is lowest.

It should be noted that methods other than the aforementioned ones are also known.

As described above, data reliability and the speeding-up of a request processing are in a trade-off relationship.

Various methods have been thought as a method for combining data reliability and the speeding-up of a request processing (see, for example, patent literature 1). In patent literature 1, a freshness threshold value is set in child nodes for replicating data of a route node, an update period is determined based on the freshness threshold value, and data of each child node is updated.

Patent Literature 1: JP2009-545072A

SUMMARY

However, in the invention disclosed in Patent Literature 1, the speeding-up of a processing cannot be realized since a processing of waiting for responses from the nodes is included.

The present invention aims to provide a computer system in which a plurality of servers are connected via a network and which includes a NoSQL (Not only SQL) database capable of combining data reliability and the speeding-up of a request processing by determining the completion of a replication processing without communicating with slave servers, and a data management method.

A representative example of the present disclosed invention is a computer system including a plurality of computers connected via a network configured to carry out a task using a database including storage areas of the plurality of computers. Each of the plurality of computers includes a processor, a memory connected to the processor, and a network interface connected to the processor and configured to communicate with other computers via the network. The computer system comprises a first computer for managing a data set including piece of data. The first computer is configured to: store replicated data of data included in data sets managed by the other computers; store new first data in the memory upon receiving a storage request for the first data; replicate the first data to generate first replicated data; transmit the generated first replicated data to the other computers; determine whether or not the first replicated data has been transmitted to the network; and carry out a task using the first data when determining that the first replicated data has been transmitted to the network.

According to the present invention, the computer can carry out a task using stored data when detecting the transmission of replicated data to the network. Specifically, since the task can be carried out without waiting for the completion of the storage of the replicated data in the other computer, the replication processing can be completed at a high speed. Further, by detecting the transmission of replicated data to the network, it can be guaranteed that pieces of identical data are present in the computer and the network and data reliability can be increased.

DESCRIPTION OF THE EMBODIMENTS

Hereinafter, the present invention is described in detail with reference to the drawings.

[First Embodiment]

Figure 1:
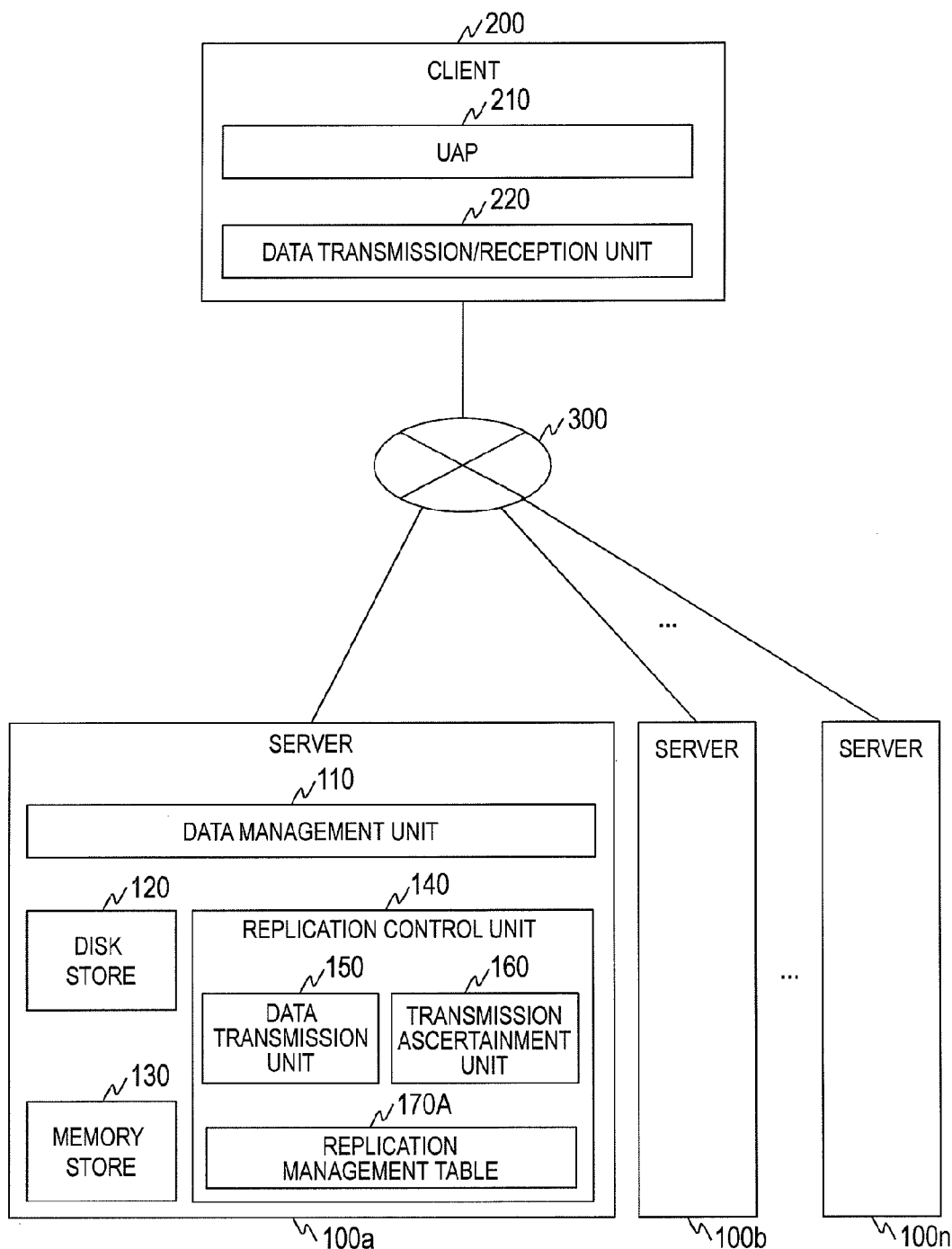
FIG. 1 is a block diagram showing the configuration of a computer system in a first embodiment of the present invention.

FIG. 1 is a block diagram showing the configuration of a computer system in a first embodiment of the present invention.

The computer system is composed of a plurality of servers 100, a client device 200 and a network 300. The servers 100 or the servers 100 and the client device 200 are connected to each other via the network 300.

The network 300 is thought to have various wired and wireless configurations such as LAN, WAN and SAN. In the present embodiment, the network 300 may be any network as long as the servers 100a to 100n and the client device 200 can communicate. It should be noted that the network 300 includes a plurality of network devices (not shown). The network device includes, for example, switches, gateways and the like.

In the present embodiment, a cluster is composed of a plurality of servers 100 and a NoSQL database is built on storage areas of these servers 100. In the present embodiment, a KVS is assumed to be used as the NoSQL database.

The servers 100a, 100b and 100n are computers constituting the KVS. Various processings are performed according to a demand from the client device 200. It should be noted that the servers 100a, 100b and 100n are assumed to be identically configured.

Pieces of data managed for each key range are arranged in the server 100a, which operates as a master server for managing the data included in a predetermined key range. Further, the server 100a holds replicated data of data included in key ranges managed by the other servers 100b and/or 100n and operates as a slave server. Similarly, each of the servers 100b and 100n functions as a master server for managing data included in a key range of its own and holds replicated data of data included in key ranges of the other servers.

Further, the cluster of the present embodiment is so configured that no single server is present as a management server for managing the entire computer system and all the servers 100a, 100b and 100n are treated as equivalent servers. Since this enables the other slave server to continue a processing as a new master server even if a failure occurs in one server, the processing can be continued without stopping the computer system. In the following description, a case where the master server is the server 100a and the slave servers are the servers 100b and 100n is described to simplify description.

The server 100a includes a data management unit 110, a disk store 120, a memory store 130 and a replication control unit 140.

The data management unit 110 controls various processings for data managed by the server 100a. The data management unit 110 receives a request from the client device 200 and controls a processing such as data reading and writing based on that request. It should be noted that "writing" may be "overwriting" of data. "Writing" and "overwriting" are collectively called "storage" in some cases below.

The disk store 120 and the memory store 130 are components of the NoSQL database constituting the KVS. The disk store 120 is a database configured on a storage medium such as an HDD. The memory store 130 is a database configured on a storage medium such as a memory.

In the present embodiment, pieces of data of the same format are stored in the disk store 120 and the memory store 130. The format of data stored in the disk store 120 and the memory store 130 is described later using FIG. 3.

The replication control unit 140 controls a replication processing (replication) for storing data stored in the server 100a in the other servers 100b and 100n. The replication control unit 140 includes a data transmission unit 150, a transmission ascertainment unit 160 and a replication management table 170A.

The data transmission unit 150 transmits replicated data to the servers 100b and 100n as slave servers. In the present embodiment, the data transmission unit 150 transmits the replicated data using a multicast notification (multicast communication).

For example, in UDP multicasting, data is transmitted to all the servers belonging to a predetermined group by being transmitted to a multicast address assigned to the predetermined group. It should be noted that the present invention is not limited to a protocol for realizing a multicast notification.

The transmission ascertainment unit 160 determines whether or not the replication processing has been completed. The replication management table 170A stores information for managing the replication processing of the replicated data by the transmission ascertainment unit 160. The replication management table 170A is described in detail later using FIG. 4.

The client device 200 is a computer with a processor (not shown), a memory (not shown), a network interface (not shown) and the like, and requests the execution of various processings on the KVS. The client device 200 includes a UAP 210 and a data transmission/reception unit 220.

The UAP 210 is an application for providing various functions and requests of various processings are transmitted to the servers 100 by the UAP 210. The data transmission/reception unit 220 transmits a request output from the UAP 210 to the server 100a and receives a processing result from the server 100a.

It should be noted that although one client device 200 is provided in FIG. 1, a plurality of client devices 200 may be provided.

Figure 2:
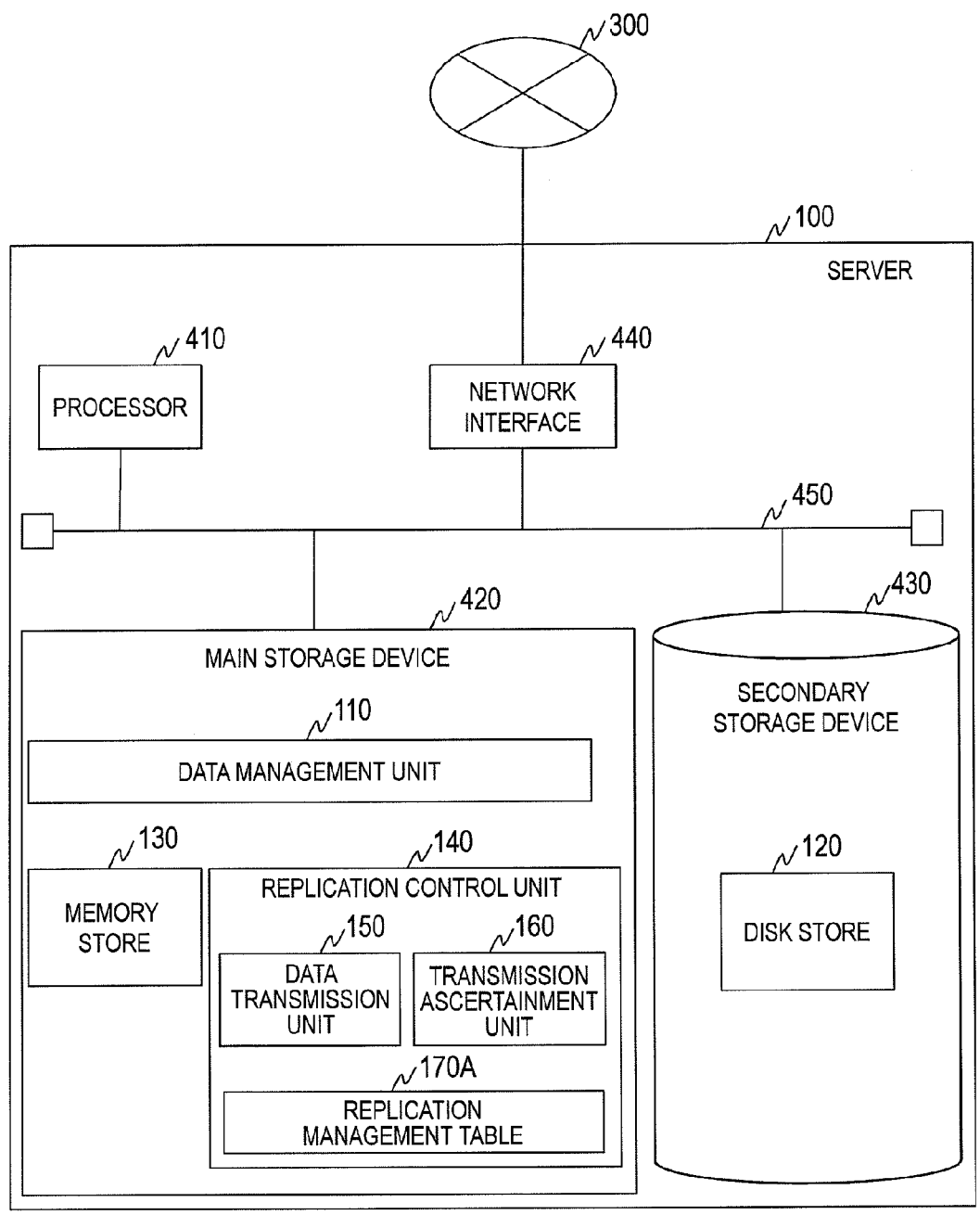
FIG. 2 is a block diagram showing the physical configuration of a server in the first embodiment of the present invention.

FIG. 2 is a block diagram showing the hardware configuration of the server 100a in the first embodiment of the present invention.

The server 100a includes a processor 410, a main storage device 420, a secondary storage device 430 and a network interface 440, and each configuration is connected by an internal bus 450 and the like.

The processor 410 executes a program stored in the main storage device 420. By the execution of the program by the processor 410, functions of the server 100 can be realized. A processing described below with each configuration as a subject indicates the execution of the program by the processor 410.

The main storage device 420 stores the program to be executed by the processor 410 and information necessary for the execution of that program. The main storage device 420 is, for example, thought to be a memory. The data management unit 110, the memory store 130 and the replication control unit 140 are built on the main storage device 420 of the present embodiment.

It should be noted that although the data management unit 110 and the replication control unit 140 are written as the program in the present embodiment, the same functions may be realized using dedicated hardware.

The secondary storage device 430 stores various pieces of information. The secondary storage device 430 is, for example, thought to be a HDD or SSD. The disk store 120 is built on the secondary storage device 430 of the present embodiment.

The network interface 440 is an interface for connection to the network 300.

It should be noted that the client device 200 also has a similar configuration. Specifically, the client device 200 includes a processor (not shown), a main storage device (not shown), a secondary storage device (not shown) and a network interface (not shown). Further, the client device 200 may also include an input/output device (not shown) such as a keyboard and a display.

Figure 3:
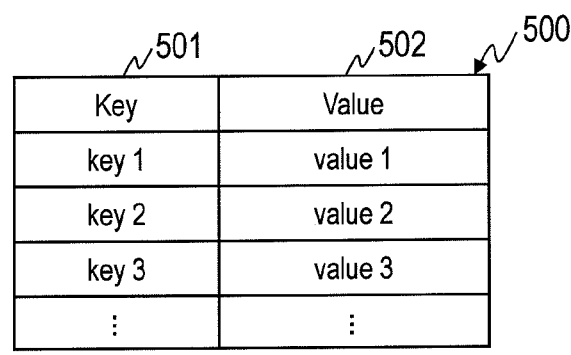
FIG. 3 is a table showing the format of data to be stored in a disk store and a memory store in the first embodiment of the present invention.

FIG. 3 is a table showing the format of data stored in the disk store 120 and the memory store 130 in the first embodiment of the present invention.

In the present embodiment, data management information 500 is stored in the disk store 120 and the memory store 130. The data management information 500 includes pieces of data, each of which is a pair of a key and a value. Data as a pair of a key and a value is also written as key-value type data below.

The data management information 500 includes key 501 and value 502. Identifiers (keys) for identifying data are stored under the key 501. Actual data (values) is stored under the value 502.

A user operating the client device 200 can store data in the KVS by designating the key 501 and obtain desired data from the KVS by designating the key 501.

Each server 100a or the like manages the key-value type data for each range of a predetermined key 501 (key range). Specifically, the key-value type data is distributed in each server for each key range. The server 100a or the like executes a processing as a master server of data in a designated key range. This enables a large quantity of data to be processed in parallel and at a high speed.

Further, each server 100 holds replicated data of key-value type data managed by the other servers 100. Specifically, the server 100 serves as a slave server of the other servers 100.

This enables the slave server 100 to continue a processing as a new master server 100 even if a failure occurs in the master server 100.

Figure 4:
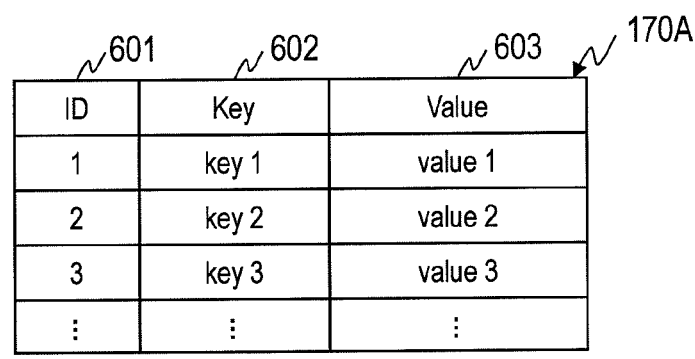
FIG. 4 is a diagram showing an example of a replication management table in the first embodiment of the present invention.

FIG. 4 is a diagram showing an example of the replication management table 170A in the first embodiment of the present invention.

The replication management table 170A includes ID 601, key 602 and value 603.

Identifiers for identifying requests transmitted from the client device 200 are stored under the ID 601. By the ID 601, the replication control unit 140 can grasp in response to which storage request the replication processing is being executed.

Information on keys for identifying data is stored under the key 602. Data to be written is stored under the value 603. It should be noted that the key 602 and the value 603 are respectively the same as the key 501 and the value 502.

Figure 5:
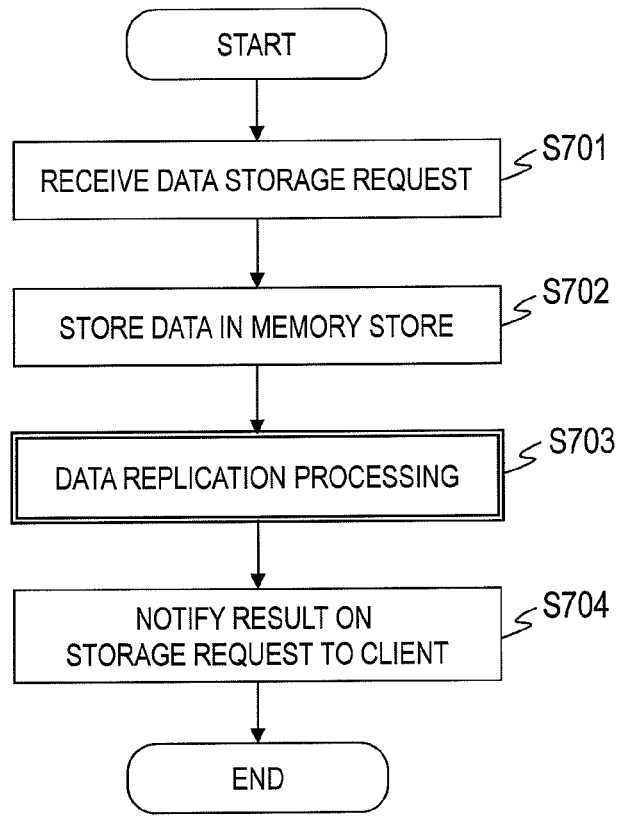
FIG. 5 is a flow chart showing a processing performed by the sever in the first embodiment of the present invention.

FIG. 5 is a flow chart showing a processing performed by the server 100a in the first embodiment of the present invention.

The server 100a receives a data storage request from the client device 200 (Step S701). Specifically, the data management unit 110 receives the storage request from the client device 200. It should be noted that the storage request includes a key and data.

The server 100a stores the key-value type data uniting the key and the data included in the storage request in the memory store 130 (Step S702). Specifically, the data management unit 110 stores the key-value type data in the memory store 130.

The server 100a performs a replication processing of the stored key-value type data (Step S703). Specifically, the following processing is performed.

The data management unit 110 calls the replication control unit 140 and instructs to perform the replication processing. The called replication control unit 140 generates replicated data of the stored key-value type data.

The replication control unit 140 transmits the generated replicated data to the slave servers 100 using a multicast notification. Further, the replication control unit 140 determines the completion of the storage of the replicated data. Specifically, whether or not the replication processing has been completed is determined.

It should be noted that the replication processing is described in detail later using FIGS. 6 to 8.

The server 100 notifies a result of the storage request to the client device 200 (Step S704) and finishes the processing.

In a conventional replicated data storage processing, the master server 100a notified a result on a storage request to the client device 200 after receiving a notification of the completion of the storage of the replicated data from the slave server 100b or 100n. Thus, there was a delay. Accordingly, the computer system could not carry out a task using the stored key-value type data until receiving a notification of the completion of the storage of the replicated data from the slave server 100b or 100n. Specifically, a write processing, a read processing, an update processing and the like for the key-value type data stored in the master server 100a after the storage processing could not be performed.

The present embodiment is characterized in that the master server 100a can notify a result of the storage request without receiving a response from the slave server 100b or 100n. Specifically, the master server 100a determines the completion of the replication processing even if there is no response from the slave server 100b or 100n.

In this way, the write processing, the read processing, the update processing and the like for the key-value type data stored in the master server 100a can be performed earlier that much. Specifically, the master server 100a can receive the processing for the stored key-value type data.

In the first embodiment, the replicated data is transmitted to a plurality of slave servers 100 using the multicast notification to ensure data reliability. Further, in the first embodiment, whether or not the replication processing has been completed is determined based on the reliability of the network 300. There are three methods as a specific determination processing.

In a first method, the replication processing is determined to be completed when the replicated data is transmitted from the master server 100a to the network 300.

This makes it unnecessary to wait for a response on the completion of the replication processing from the slave server 100b or 100n. Further, since the replicated data is present on the network 300 by the output of the replicated data from the master server 100a, the output replicated data is eventually received by the slave server 100b or 100n and the slave server 100b or 100n, in which the replicated data is stored, can continue the processing even if a failure occurs in the master server 100a after the transmission. Further, since the replicated data on the network 300 is reflected on each slave server 100, data reliability can be ensured.

In a second method, the completion of the replication processing is determined when the master server 100a receives a response to the effect of receiving the replicated data from a network device on the network 300.

This makes it unnecessary to wait for a response from the slave servers 100. Further, the transmission of the replicated data to each slave server 100 via the network 300 can be guaranteed by ascertaining the reception of the replicated data from the network device on the network 300. Specifically, data reliability is improved as compared with the first method.

In a third method, the completion of the replication processing is determined when the master server 100a periodically ascertains a state of the network 300 and the state of the network 300 is normal.

This makes it unnecessary to wait for a response from the slave servers 100. Further, the transmission of the replicated data to each slave server 100 from the network 300 can be guaranteed by ascertaining the state of the network 300. Specifically, data reliability is improved as compared with the first method.

Each method is described in detail below.

Figure 6:
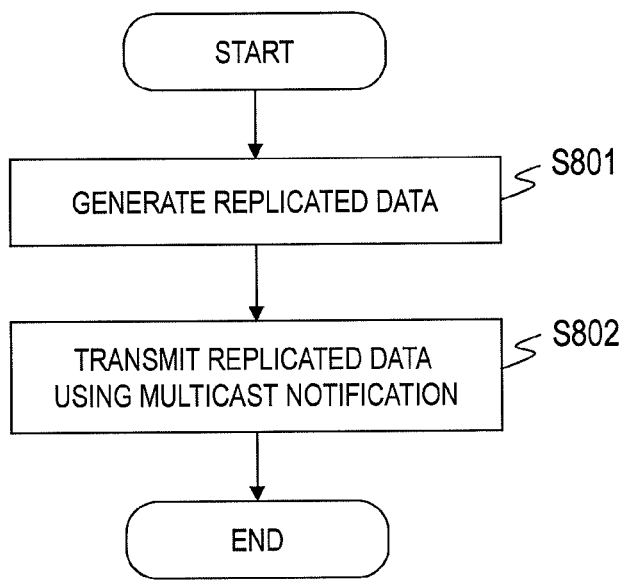
FIG. 6 is a flow chart showing a processing performed by a replication control unit in the first embodiment of the present invention.

FIG. 6 is a flow chart showing a processing performed by the replication control unit 140 in the first embodiment of the present invention. FIG. 6 shows a replication processing to which the first method is applied.

The replication control unit 140 generates replicated data of stored key-value type data (Step S801) when being called by the data management unit 110.

The replication control unit 140 transmits the generated replicated data to each slave server 100b and/or 100n using a multicast notification (Step S802) and finishes the processing. Specifically, the data transmission unit 150 transmits the replicated data to a multicast address.

It should be noted that the replication control unit 140 determines the completion of the replication processing when detecting the transmission of the replicated data to the network 300.

Accordingly, it is not necessary to receive a response on the completion of the replication processing from the slave servers 100b and/or 100n in the first method, wherefore a task processing is not delayed. Further, even if a failure occurs in the master server 100a, the replicated data is output to the network 300 before that. Thus, the slave servers 100b and 100n having received that replicated data can continue the task processing. Specifically, data reliability can be ensured by the presence of pieces of identical data at different locations in the computer system.

Further, in the first method, the completion of the replication processing is determined when the replicated data is transmitted (output) to the network 300. Thus, an improvement in data reliability can be expected as compared with a conventional replication processing by asynchronization.

Figure 7:
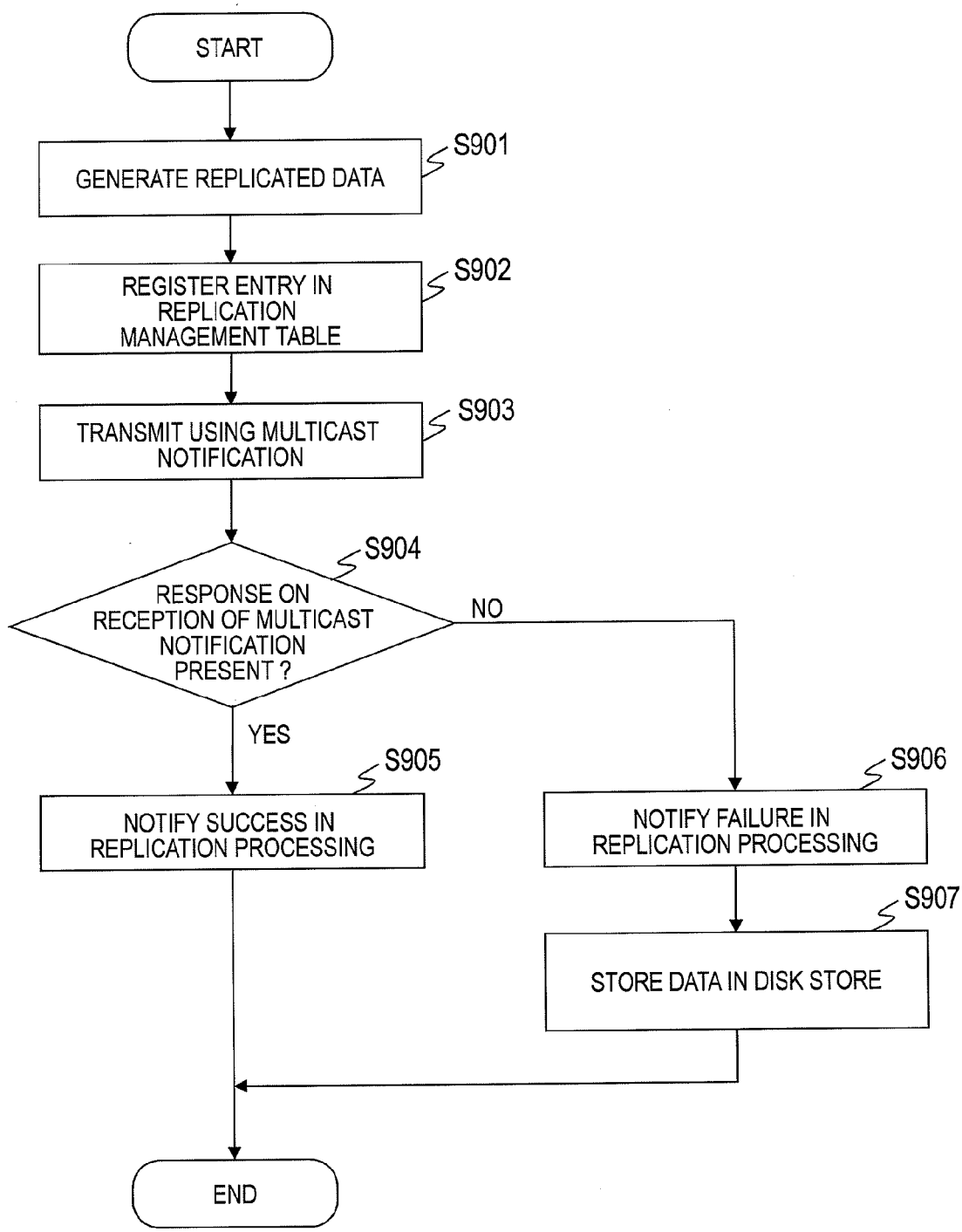
FIG. 7 is a flow chart showing a processing performed by the replication control unit in the first embodiment of the present invention.

FIG. 7 is a flow chart showing a processing performed by the replication control unit 140 in the first embodiment of the present invention. FIG. 7 shows a replication processing to which the second method is applied.

The replication control unit 140 generates replicated data of stored key-value type data (Step S901) and registers an entry relating to the replicated data in the replication management table 170A (Step S902) when being called by the data management unit 110.

The replication control unit 140 transmits the generated replicated data using a multicast notification (Step S903). Specifically, the data transmission unit 150 transmits the replicated data to a multicast address.

The replication control unit 140 determines whether or not the multicast notification including the replicated data and transmitted from the data transmission unit 150 has been received from a network device included in the network 300 (Step S904). Specifically, it is determined whether or not the transmission ascertainment unit 160 has received the multicast notification including the replicated data from the network device included in the network 300 within a given time and an entry corresponding to the ID 601 (FIG. 4) included in that multicast notification is registered in the replication management table 170A.

If the transmission ascertainment unit 160 receives the multicast notification including the replicated data from the network device within the given time, it indicates that the state of the network 300 is normal. This can guarantee the transmission of the replicated data to the slave servers 100 via the network 300 in a normal state.

On the other hand, if the transmission ascertainment unit 160 cannot receive the multicast notification including the replicated data from the network device within the given time, it indicates that a certain failure has occurred in the network 300. Thus, there is a high possibility that the replicated data has not been transmitted to the slave servers 100.

It should be noted that a waiting time for the reception of a packet is assumed to be set in advance. However, it can be changed to an arbitrary time. The waiting time is, for example, preferably shorter than a time until the reception of a response on the completion of the replication processing from the slave servers 100b and/or 100n.

In the case of being able to receive the multicast notification including the replicated data within the given time, the replication control unit 140 gives a notification to the effect that the replication processing has succeeded to the data management unit 110 (Step S905) and finishes the processing. Specifically, the completion of the replication processing is determined.

In the case of being unable to receive the multicast notification including the replicated data within the given time, the replication control unit 140 gives a notification to the effect that the replication processing has failed to the data management unit 110 (Step S906). Further, the replication control unit 140 stores the data stored in the memory store 130 in the disk store 120 (Step S907) and finishes the processing.

Since this causes latest data to be held even in the case of the power-off or the like of the server 100, fault tolerance can be ensured.

It should be noted that the data transmission unit 150 prevents the transmission of the replicated data to itself (loopback) in the case of transmitting the replicated data using the multicast notification. Further, the data transmission unit 150 may control to eliminate this notification if the replicated data is transmitted to the data transmission unit 150 itself by loopback. Whether or not a notification is the one by loopback can be determined, for example, by referring to a destination address included in the notification.

The aforementioned control is executed to certainly receive a multicast notification from the network device included in the network 300, specifically to avoid a situation where the transmission ascertainment unit 160 erroneously recognizes a notification transmitted to itself by loopback to be the one received from the network 300.

Further, the corresponding entry may be deleted from the replication management table 170A after the processing of Step S906 or S909 is performed. Specifically, the transmission ascertainment unit 160 analyzes the received packet, obtains the key and the value of the replicated data, and searches an entry matching the obtained key and value by referring to the replication management table 170A. The transmission ascertainment unit 160 deletes the matching entry from the replication management table 170A.

Since the completion of the replication processing is determined based on the response from the network device according to the second method, the speeding-up of the processing is possible as compared with the case where a response on the completion of the replication processing or the like is received from the slave servers 100b and/or 100n. Specifically, a request processing speed is improved as compared with the case of using a replication processing by synchronization as before. Further, in the second method, it can be guaranteed that the replicated data is reliably transmitted via the network 300 in the normal state by ascertaining the state of the network 300. Therefore, data reliability is improved as compared with the first method.

Figure 8:
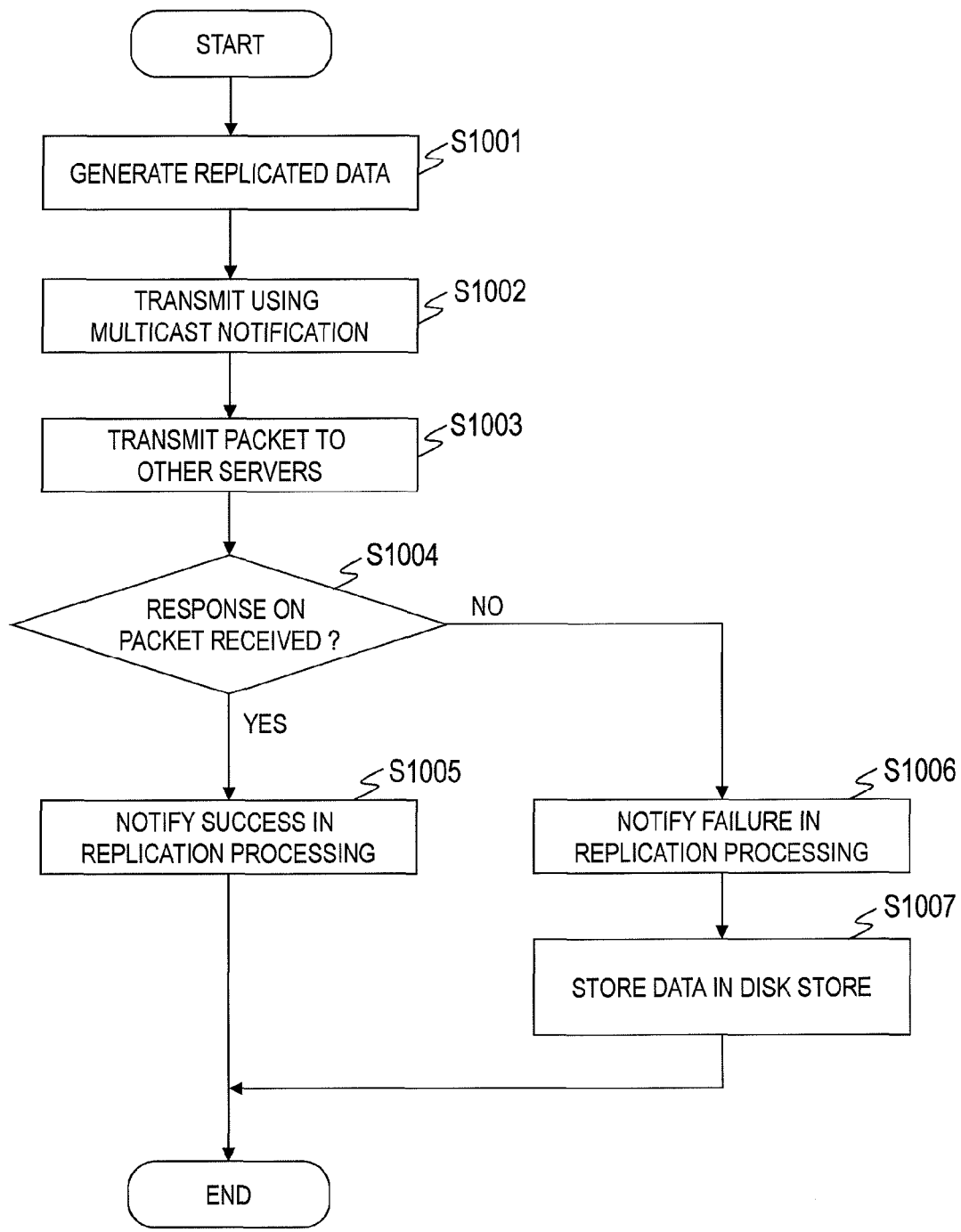
FIG. 8 is a flow chart showing a processing performed by the replication control unit in the first embodiment of the present invention.

FIG. 8 is a flow chart showing a processing performed by the replication control unit 140 in the first embodiment of the present invention. FIG. 8 shows a replication processing to which a third method is applied.

The replication control unit 140 generates replicated data of stored key-value type data (Step S1001) when being called by the data management unit 110.

The replication control unit 140 transmits the generated replicated data using a multicast notification (Step S1002). Specifically, the data transmission unit 150 transmits the replicated data to a multicast address.

The replication control unit 140 transmits a predetermined packet to the slave servers 100b and 100n (Step S1003) and determines whether or not a response on that packet has been received (Step S1004). Specifically, the transmission ascertainment unit 160 periodically executes a ping command to transmit an ICMP packet to the slave servers 100b and 100n and waits for a response on that packet.

It should be noted that the processing of Step S1003 may be performed as a processing independent of the replication processing. Specifically, the transmission ascertainment unit 160 may periodically check a communication state with the slave servers 100b and 100n and refer to an ascertainment result on the communication state when the replication processing is performed.

It should be noted that a period of the processing for ascertaining the communication state is assumed to be set in advance. However, this period can be changed to an arbitrary period.

In the case of being able to receive the response on the packet from the slave servers 100b and 100n, it indicates that the state of the network 300 is normal and communication with the slave servers 100 is normal. This can guarantee the transmission of the replicated data to the slave servers 100b and 100n via the network 300 in a normal state.

On the other hand, in the case of being unable to receive the response on the packet from the slave servers 100b and 100n, there is a possibility that the replicated data has not been transmitted to the slave servers 100b and 100n due to a certain failure having occurred in the network 300.

In the case of receiving the response on the predetermined packet, the replication control unit 140 gives a notification to the effect that the replication processing has succeeded to the data management unit 110 (Step S1005) and finishes the processing. Specifically, the completion of the replication processing is determined.

In the case of being unable to receive the response on the predetermined packet, the replication control unit 140 gives a notification to the effect that the replication processing has failed to the data management unit 110 (Step S1006). Further, the replication control unit 140 stores the data stored in the memory store 130 in the disk store 120 (Step S1007) and finishes the processing.

Since this causes latest data to be held even in the case of the power-off or the like of the server 100, fault tolerance can be ensured.

According to the third method, the completion of the replication processing is determined based on the communication state with the slave servers 100. Further, since the response on the packet used in the communication state ascertainment method is faster than the notification on the completion of the storage of the replicated data, a processing speed is improved as compared with the conventional second method. Further, since communication with the slave servers 100 via the network 300 is ascertained in the third method, data reliability is improved as compared with the second method.

It should be noted that although an example in which the master server 100a transmits a ping to the slave server 100b and the like after giving the multicast notification of the replicated data is described in the above third method, the present invention is not limited to this. For example, the master server 100a may transmit a ping to the slave server 100b and the like before (e.g. immediately before) giving a multicast notification, the transmission ascertainment unit 160 may notify a success in the replication processing to the data management unit 110 if that response result indicates a normal state and, simultaneously or thereafter, the multicast notification of the replicated data may be given. If the data size of the replicated data is larger than that of the ICMP packet used in the ping, a transmission load is reduced that much and a further improvement in data reliability and request processing performance can be expected.

Although the replicated data is transmitted by the multicast notification in the first, second and third methods as described above, the present invention is not limited to this. For example, unicast communication or the like may be used. In the case of transmitting replicated data using unicast communication, the processing speed is improved by applying the first, second or third method as compared with the conventional second and third methods.

Since the master server 100 determines whether or not the replication processing has succeeded based on the state of the network 300 according to the first embodiment, a faster processing than conventional replication processings is possible. Therefore, it is possible to improve processing performance as compared with conventional computer systems and ensure data reliability.

[Second Embodiment]

A second embodiment differs in that a state of a network is ascertained by ascertaining states of services and processes operating on the network. The following description is centered on differences from the first embodiment.

Figure 9:
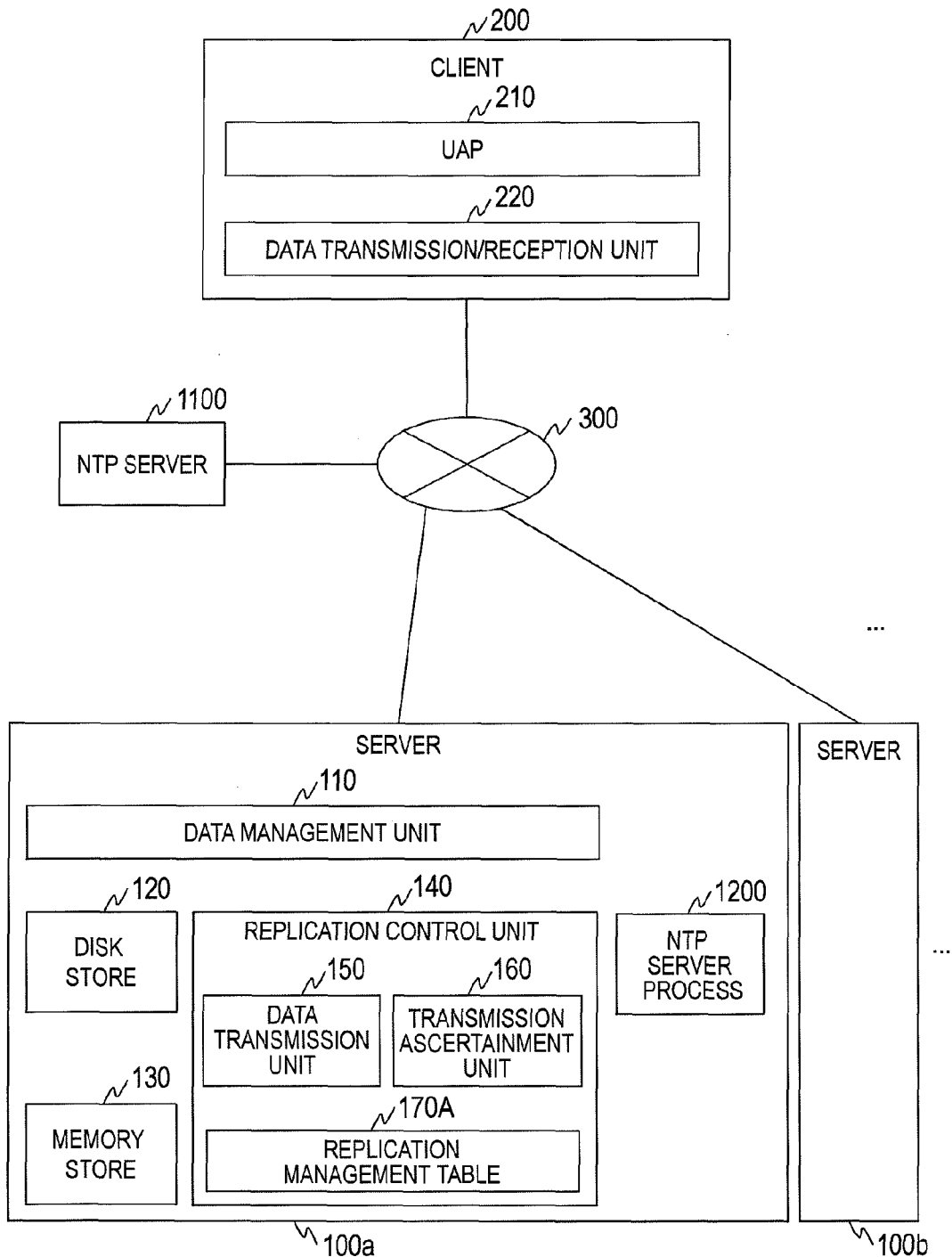
FIG. 9 is a block diagram showing the configuration of a computer system in a second embodiment of the present invention.

FIG. 9 is a block diagram showing the configuration of a computer system in the second embodiment of the present invention.

The computer system in the second embodiment newly includes an NTP server 1100. Further, an NTP server process 1200 operates on a server 100. The other configuration is the same as in the first embodiment.

The NTP server 1100 performs a processing for time synchronization of computers connected to a network 300. It should be noted that the processing performed by the NTP server 1100 is not described since it is a known technique. Further, the NTP server 1100 is not described since it has the same physical configuration as the server 100a and the like.

The NTP server process 1200 is a process for synchronization with times managed by the NTP server 1100.

Figure 10:
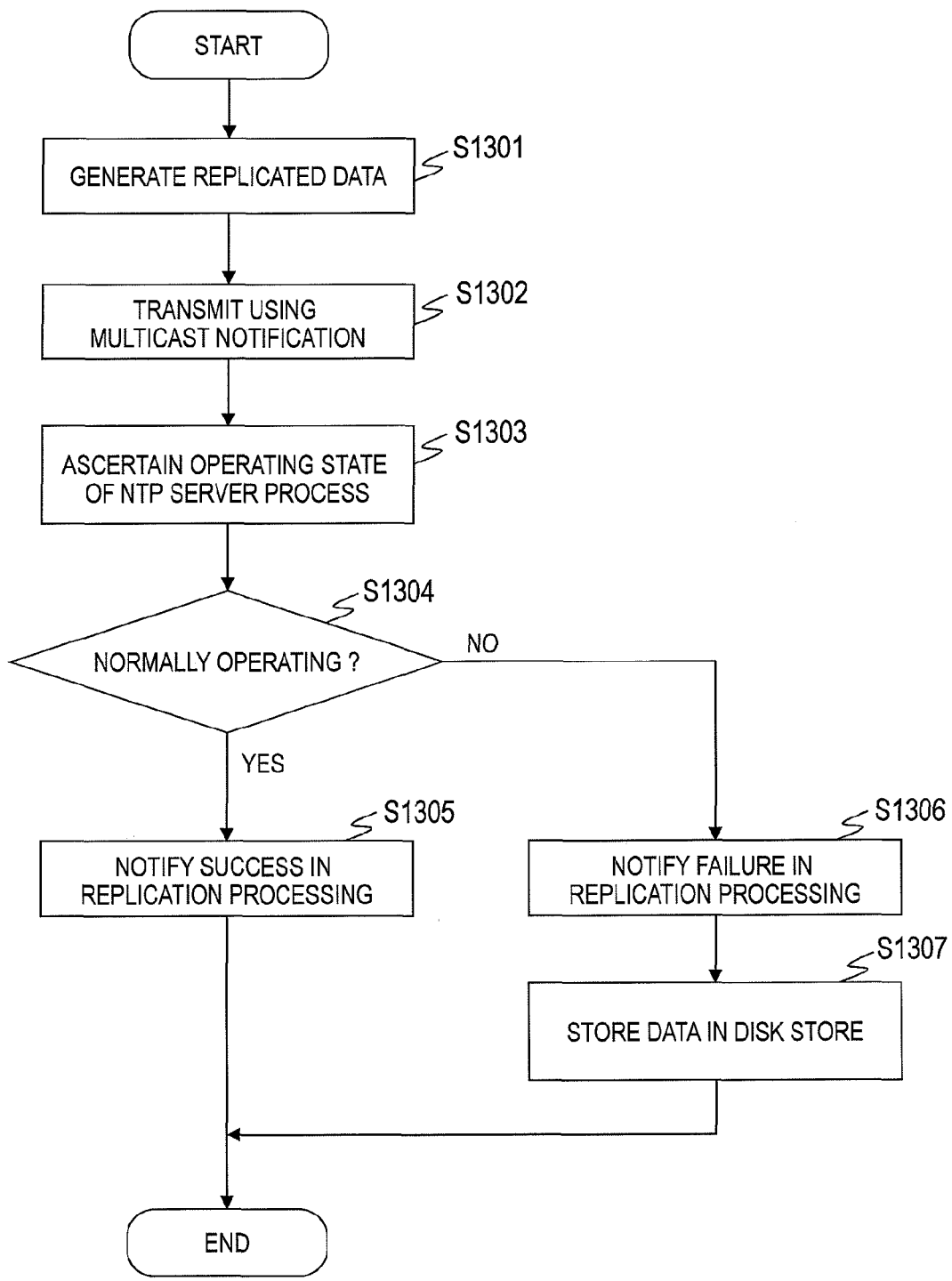
FIG. 10 is a flow chart showing a processing performed by a replication control unit in the second embodiment of the present invention.

FIG. 10 is a flow chart showing a processing performed by a replication control unit 140 in the second embodiment of the present invention.

The replication control unit 140 generates replicated data of stored key-value type data (Step S1301) when being called by a data management unit 110.

The replication control unit 140 transmits the generated replicated data using a multicast notification (Step S1302). Specifically, a data transmission unit 150 transmits the replicated data to a multicast address.

The replication control unit 140 ascertains an operating state of the NTP server process 1200 (Step S1303) and determines whether or not the NTP server process 1200 is normally operating (Step S1304). Specifically, a transmission ascertainment unit 160 periodically ascertains the operating state of the NTP server process 1200.

It should be noted that the processing of Step S1303 may be a processing independent of a replication processing. Specifically, the transmission ascertainment unit 160 may periodically check the operating state of the NTP server process 1200 and refer to an ascertainment result when the replication processing is performed. A failure occurs in the NTP server process 1200 if an abnormality occurs in communication with the NTP server 1100, wherefore an abnormality of the network 300 can be detected by this.

It should be noted that a period of the processing for ascertaining the operating state of the process is assumed to be set in advance. However, this period can be changed to an arbitrary period.

If the NTP server process 1200 is normally operating, it indicates that the state of the network 300 is normal. This can guarantee the transmission of the replicated data to slave servers 100 via the network 300 in a normal state.

On the other hand, unless the NTP server process 1200 is normally operating, there is a possibility that the replicated data has not been transmitted to the slave servers 100 due to a certain failure having occurred in the network 300.

If the NTP server process 1200 is normally operating, the replication control unit 140 gives a notification to the effect that the replication processing has succeeded to the data management unit 110 (Step S1305) and finishes the processing.

Unless the NTP server process 1200 is normally operating, the replication control unit 140 gives a notification to the effect that the replication processing has failed to the data management unit 110 (Step S1306). Further, the replication control unit 140 stores data stored in a memory store 130 in a disk store 120 (Step S1307) and finishes the processing.

Since this causes latest data to be held even in the case of the power-off or the like of the server 100, fault tolerance can be ensured.

Although the state of the network 300 is ascertained using the NTP server 1100 in the second embodiment, the present invention is not limited to this. Specifically, any service provided via the network 300 can be applied to the present invention.

Since the master server 100*a* determines the state of the network 300 based on the process operating on the network according to the second embodiment, it is not necessary to directly obtain information from the network 300, wherefore a processing can be performed at a high speed. Hence, performance can be improved as compared with conventional computer systems.

[Third Embodiment]

In a third embodiment, a server 100*a* performs a retransmission processing for replicated data to further improve data reliability. The retransmission processing is a processing performed after a replication processing is finished and does not affect a delay of the replication processing. Specifically, the retransmission processing is performed as a processing independent of the replication processing. The following description is centered on differences from the first embodiment.

Figure 11:
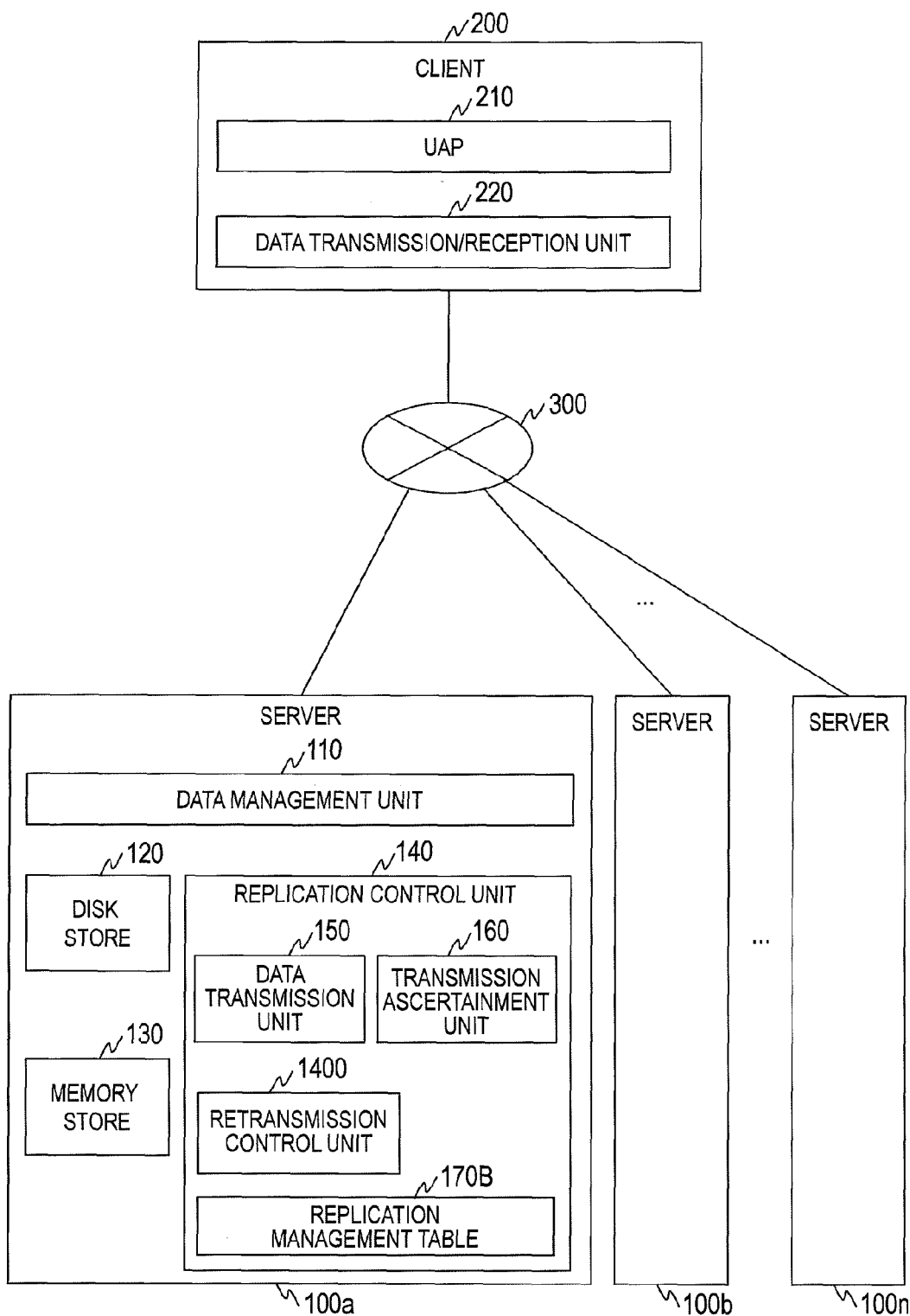
FIG. 11 is a block diagram showing the configuration of a computer system in a third embodiment of the present invention.

FIG. 11 is a block diagram showing the configuration of a computer system in the third embodiment of the present invention.

The computer system in the third embodiment differs in that a replication control unit 140 of a server 100*a* newly includes a retransmission control unit 1400. By including the retransmission control unit 1400, the replication control unit 140 can further perform a function of transmitting a storage completion notification to a master server when the storage of replicated data transmitted from the master server via a network 300 is completed if the server 100*a* is a slave server and a function of managing whether or not replicated data is stored in a slave server and transmitting the replicated data to the slave server again when the replicated data is not stored (retransmission processing function) if the server 100*a* is a master server. The replication control unit 140 periodically performs the retransmission processing. Further, the computer system of the third embodiment also differs from the first embodiment in including a replication management table 170B obtained by adding management items to the replication management table 170A of the first embodiment. The other configuration is the same as in the first embodiment.

It should be noted that the present embodiment is described, taking a case where replicated data is transmitted to two slave servers 100*b* and 100*n* as an example.

Figures 12, 13:
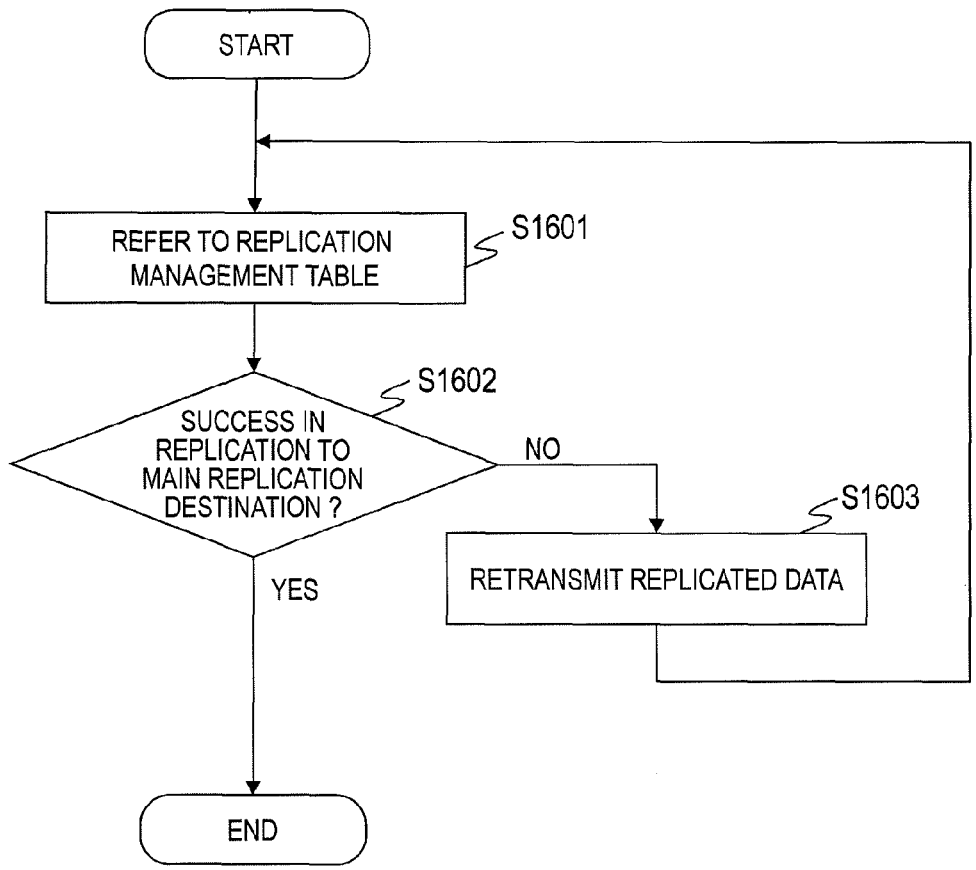
FIG. 12 is a diagram showing an example of a replication management table in the third embodiment of the present invention.
FIG. 13 is a flow chart showing a processing performed by a replication control unit in the third embodiment of the present invention.

FIG. 12 is a diagram showing an example of the replication management table 170B in the third embodiment of the present invention.

The replication management table 170B newly includes two management items of main replication destination 1501 and sub replication destination 1502. A result of the replication processing for the slave server 100*b* having a highest priority as a storage destination of the replicated data is stored under the main replication destination 1501. A result of the replication processing for the slave server 100*n* having a second highest priority as a storage destination of the replicated data is stored under the sub replication destination 1502. A result of the replication processing is "success" indicating that the replication processing has succeeded or "fail" indicating that the replication processing has failed.

In a KVS, the priorities of the slave servers 100*b* and 100*n* are determined. For example, a method for determining priorities for the slave servers in descending order according to proximity of key ranges managed thereby as a master server to a key range managed by the master server 100*a* is thought. It should be noted that the method for detecting the priorities of the slave servers 100*b* and 100*n* is not described in detail since it is a known technique.

Since the replicated data is transmitted to the two slave servers 100*b* and 100*n* in the present embodiment, only the two slave servers 100*b* and 100*n* having high priorities are targeted. However, the present invention is not limited to this and replicated data may be transmitted to three or more slave servers.

Here, the processing of the replication control unit 140 including the retransmission control unit 1400 is described.

Replication control units 140 in the slave servers 100*b* and 100*n* detect the reception of the replicated data transmitted from the master server 100*a* and transmit a notification to the effect that the replication processing has succeeded to the master server 100*a*. It should be noted that an identifier of the slave server 100*b* or 100*n* and that of the replicated data are included in this notification.

Further, the replication control unit 140 in the master server 100*a* obtains the identifier of the slave server 100*b* or 100*n* and that of the replicated data included in the notification when receiving the notification to the effect that the replication processing has succeeded from the slave server 100*b* or 100*n*.

The replication control unit 140 searches a corresponding entry from the replication management table 170B based on the obtained identifier of the replicated data. Further, the replication control unit 140 specifies the slave servers 100 as replication destinations from the identifiers of the slave servers 100*b*, 100*n* and stores "success" under the main replication destination 1501 and the sub replication destination 1502 of the corresponding entry.

It should be noted that the replication control unit 140 periodically refers to the replication management table 170B and stores "fail" for an entry for which the notification to the effect that the replication processing has succeeded cannot be received within a given period of time.

FIG. 13 is a flow chart showing a processing performed by the replication control unit 140 of the master server 100*a* in the third embodiment of the present invention.

The replication control unit 140 refers to the replication management table 170B and determines whether or not the replication processing has succeeded in the slave server 100*b* as the main replication destination (Step S1601, Step S1602).

Specifically, the retransmission control unit 1400 refers to the replication management table 170B and determines whether or not all the entries under the main replication destination 1501 are "success". If at least one of the entries under the main replication destination 1501 is "fail", it is determined that the replication processing has failed in the slave server as the main replication destination.

If it is determined that the replication processing has succeeded in the slave server 100*b* as the main replication destination, the retransmission control unit 1400 finishes the processing.

If it is determined that the replication processing has failed in the slave server 100*b* as the main replication destination, the replication control unit 140 performs the replication processing again (Step S1603). Thereafter, the replication control unit 140 returns to Step S1601 and performs a similar processing. Either one of the methods in the first and second embodiments may be used for the replication processing.

It should be noted that the replication control unit 140 may perform a similar determination processing also for the slave servers 100 as sub replication destinations. Specifically, data reliability is improved according to an increase in the number of replication destinations to be managed in the retransmission processing.

According to the third embodiment, it can be detected that the replicated data has not been transmitted to the slave servers 100b and/or 100n and the replicated data can be transmitted to the slave servers 100b and/or 100n again, data reliability can be further increased.

[Fourth Embodiment]

One feature of a fourth embodiment is to transmit a multicast notification including replicated data a plurality of number of times to extend the third embodiment and further improve data reliability. The following description is centered on differences from the first embodiment.

It should be noted that the configuration of a computer system is substantially the same as in the third embodiment, but differs in that a function of managing a transmission number of a multicast notification to slave servers is added and a data transmission unit 150 gives the multicast notification according to this transmission number. It should be noted that the other configuration is not described since it is the same as in the third embodiment.

Figure 14:
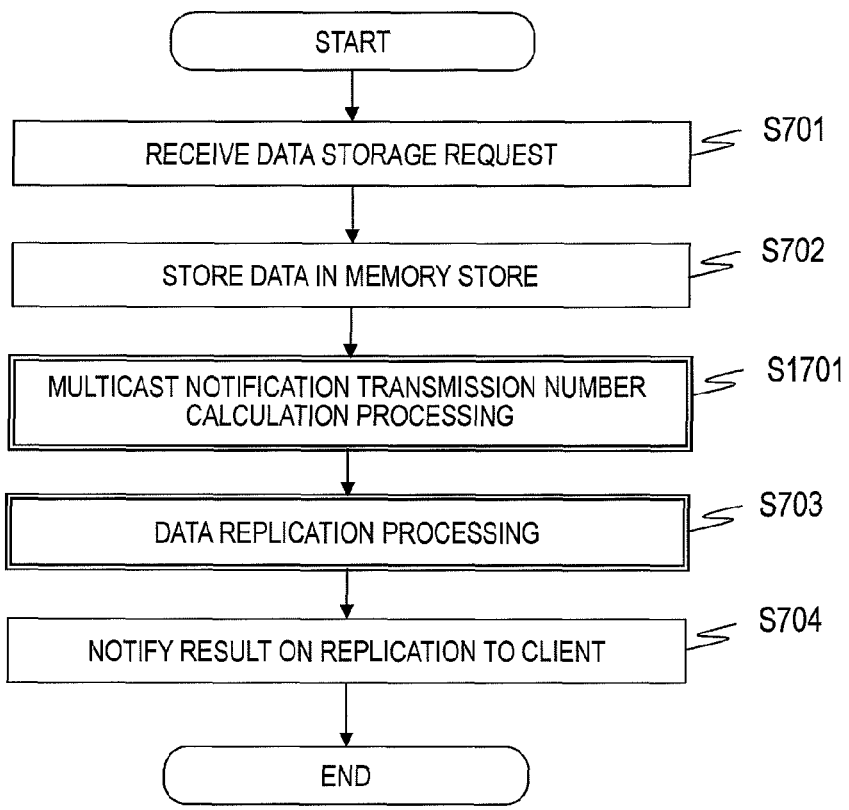
FIG. 14 is a flow chart showing a processing performed by a sever in a fourth embodiment of the present invention.

FIG. 14 is a flow chart showing a processing performed by a master server 100a in the fourth embodiment of the present invention. In FIG. 14, the processing of Step S1701 is added to the processing of the computer system of the first embodiment shown in FIG. 4.

In the fourth embodiment, the master server 100a performs a transmission number calculation processing (Step S1701) after the processing of Step S702. Specifically, a retransmission control unit 1400 calculates a transmission number of a multicast notification. A specific processing is described later using FIG. 15.

In this way, as many multicast notifications as the calculated transmission number are transmitted in a data replication processing.

The retransmission control unit 1400 in the fourth embodiment has a counter function of measuring the number of successes in the replication processing and the number of failures in the replication processing for each entry of a replication management table 170B.

The retransmission control unit 1400 updates the number of successes in the replication processing or the number of failures in the replication processing every time updating the replication management table 170B.

For example, if "fail" is stored under main replication destination 1501 and "success" is stored under sub replication destination 1502 when the number of successes in the replication processing is "9" and the number of failures in the replication processing is "5" in an arbitrary entry of the replication management table 170B, the number of successes and the number of failures in the replication processing are updated to "10" and "6".

Other processes are not described since they are the same as in the first embodiment.

Figure 15:
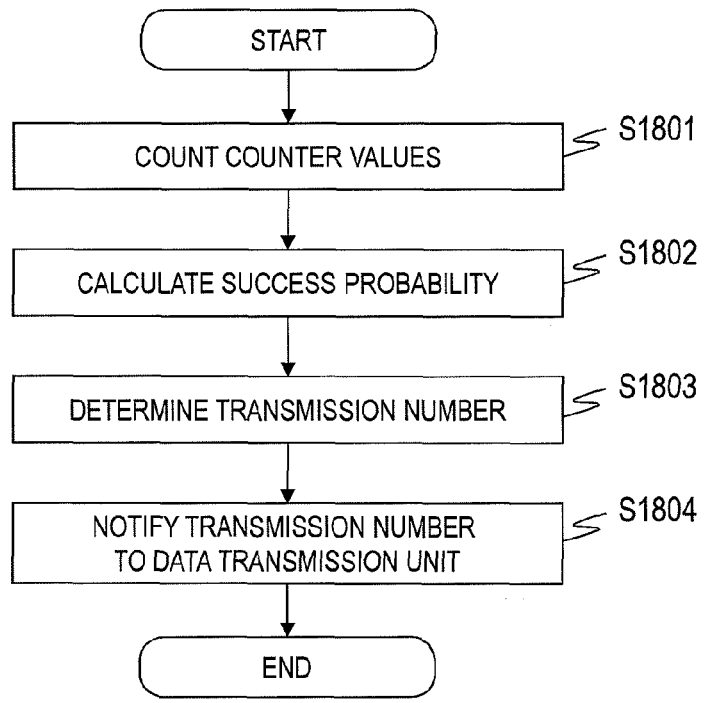
FIG. 15 is a flow chart showing a processing performed by a retransmission control unit in the fourth embodiment of the present invention.

FIG. 15 is a flow chart showing the processing performed by the retransmission control unit 1400 in the fourth embodiment of the present invention.

The retransmission control unit 1400 counts counter values (Step S1801) and calculates a success probability of the replication processing (Step S1802).

Specifically, the retransmission control unit 1400 obtains counter values corresponding to all the entries of the replication management table 170B. It should be noted that the counter values include the number of successes in the replication processing and the number of failures in the replication processing.

The retransmission control unit 1400 calculates a total value of the numbers of successes in the replication processing and a total value of the numbers of failures in the replication processing of all the entries included in the replication management table 170B based on the obtained counter values. The total value of the numbers of the successes in the replication processing is written as a total value A1 and the total value of the numbers of the failures in the replication processing is written as a total value A2 below.

The retransmission control unit 1400 calculates the success probability of the replication processing by substituting the calculated total values A1, A2 into the following Equation (1).

$$\text{Success Probability } P = A1/(A1+A2) \tag{1}$$

Subsequently, the retransmission control unit 1400 determines the transmission number of the multicast notification based on the calculated success probability of the replication processing (Step S1803).

For example, the retransmission control unit 1400 employs a method for determining an inverse of Equation (1) as the transmission number of the multicast notification. It should be noted that, if the inverse of Equation (1) is not an integer, it is rounded up to the closest integer. It should be noted that the method for determining the transmission number of the multicast notification is not limited to the aforementioned one.

The retransmission control unit 1400 notifies the determined transmission number of the multicast notification to the data transmission unit 150 (Step S1804) and finishes the processing.

It should be noted that although the success probability of the replication processing is calculated using the number of successes and the number of failures in the fourth embodiment, the present invention is not limited to this. For example, the success probability of the replication processing can be calculated using a total execution number of the replication processing and the number of successes in the replication processing. Further, the success probability of the replication processing can also be calculated using the total execution number of the replication processing and the number of failures in the replication processing.

According to the fourth embodiment, data reliability can be further enhanced by transmitting the multicast notification a plurality of times in advance.

Although the present invention has been described in detail above with reference to the accompanying drawings, the present invention is not limited to such specific configurations and encompasses various changes and equivalent configurations within the gist of the accompanying claims.

It should be noted that various types of software illustrated in the present embodiments can be stored in various storage media such as electromagnetic, electronic and optical ones and can be downloaded to computers via a communication network such as the Internet.

Further, although examples using a control by software have been described in the present embodiments, some of them can also be realized by hardware.

What is claimed is:

1. A computer system comprising a plurality of computers connected via a network configured to carry out a task using a database including storage areas of the plurality of computers,
   wherein each of the plurality of computers includes a processor, a memory connected to the processor, and a network interface connected to the processor and configured to communicate with other computers via the network,
   wherein the computer system comprises a first computer for managing a data set including piece of data,
   wherein the first computer is configured to:
   store replicated data of data included in data sets managed by the other computers;
   store new first data in the memory upon receiving a storage request for the first data;
   replicate the first data to generate first replicated data;
   transmit the generated first replicated data to the other computers;
   determine whether or not the first replicated data has been transmitted to the network; and
   carry out a task using the first data when determining that the first replicated data has been transmitted to the network;
   wherein the first computer is configured to determine whether or not the first replicated data has been stored in the other computers, and
   wherein the replicated data of the first data is transmitted again to the other computers unless the first replicated data has been stored in the other computers; and
   include a counter for measuring at least one of a number of successes and a number of failures in a storage processing of the replicated data in the other computers;
   store new second data in the memory upon receiving a storage request for the second data;
   replicate the second data to generate second replicated data;
   calculate a success probability of the storage processing of the replicated data based on a value of the counter;
   determine a transmission number of the second replicated data based on the calculated success probability; and
   transmit the generated second replicated data as many times as the determined transmission number.

2. The computer system according to claim 1, wherein the first computer is configured to transmit the generated first replicated data to the other computers using a multicast notification for simultaneously transmitting data to computers.

3. The computer system according to claim 2, wherein the first computer is configured to determine whether or not the first replicated data has been transmitted to the network by determining whether or not a communication state of the network is normal.

4. The computer system according to claim 3,
   wherein the network includes a network device for transferring data, and
   wherein the computer system is configure to:
   determine whether or not the multicast notification including the first replicated data has been received from the network device; and
   determine that the communication state of the network is normal when determining that the multicast notification including the first replicated data has been received from the network device.

5. The computer system according to claim 3,
   wherein the first computer is configured to periodically monitors a communication state with the other computers, and
   wherein the computer system is configured to:
   determine whether or not communication between the first computer with the other computers is possible by referring to a monitoring result of the communication state between the first computer and the other computers; and
   determine that the communication state of the network is normal when determining the communication between the first computer with the other computers is possible.

6. The computer system according to claim 3,
   wherein the first computer is configured to:
   execute a process for a service via the network; and
   periodically monitor an operating state of the process, and
   wherein the computer system is configured to:
   determine whether or not the process is normally operating by referring to a monitoring result on the operating state of the process; and
   determine that the communication state of the network is normal when determining the process is normally operating.

7. The computer system according to claim 1,
   wherein the database stores pieces of data each composed of a key and a data value,
   wherein each of the plurality of computers manages data sets in a predetermined key range, and
   wherein the first computer manages data sets in a first key range and stores replicated data of the data included in data sets in a predetermined key range managed by the other computers.

8. A data management method in a computer system comprising a plurality of computers connected via a network configured to carry out a task using a database including storage areas of the plurality of computers,
   wherein each of the plurality of computers includes a processor, a memory connected to the processor, and a network interface connected to the processor and configured to communicate with other computers via the network,
   wherein the computer system comprises a first computer for managing a data set including piece of data, and
   wherein the first computer is configured to store replicated data of data included in data sets managed by the other computers,
   the data management method comprising:
   a step of storing, by the first computer, new first data in the memory upon receiving a storage request for the first data;
   a step of replicating, by the first computer, the first data to generate first replicated data;
   a step of transmitting, by the first computer, the generated first replicated data to the other computers;
   a step of determining, by the first computer, whether or not the first replicated data has been transmitted to the network; and
   a of carrying out, by the first computer, a task using the first data when determining that the first replicated data has been transmitted to the network;
   a step of determining, by the first computer, whether or not the first replicated data has been stored in the other computers;
   a step of transmitting, by the first computer, the replicated data of the first data again to the other computers unless the first replicated data has been stored in the other computers;

wherein the first computer includes a counter for measuring at least one of a number of successes and a number of failures in a storage processing of the replicated data in the other computers, a step of storing, by the first computer, new second data in the memory upon receiving a storage request for the second data;

a step of replicating, by the first computer, the second data to generate second replicated data;

a step of calculating, by the first computer, a success probability of the storage processing of the replicated data based on a value of the counter;

a step of determining, by the first computer, a transmission number of the second replicated data based on the calculated success probability; and a step of transmitting, by the first computer, the generated second replicated data as many times as the determined transmission number.

9. The data management method according to claim 8, wherein the step transmitting the generated first replicated data to the other computers uses a multicast notification for simultaneously transmitting data to computers.

10. The data management method according to claim 9, wherein the step of determining, by the first computer, whether or not the first replicated data has been transmitted to the network comprises a step of determining whether or not a communication state of the network is normal.

11. The data management method according to claim 10, wherein the network includes a network device for transferring data, wherein the step of determining whether or not a communication state of the network is normal comprises:

a step of determining whether or not the multicast notification including the first replicated data has been received from the network device; and a step of determining that the communication state of the network is normal when determining that the multicast notification including the first replicated data has been received from the network device.

12. The data management method according to claim 10, wherein the first computer is configured to periodically monitor a communication state with the other computers, and wherein the step of determining whether or not a communication state of the network is normal comprises:

a step of determining whether or not communication with the other computers is possible by referring to a monitoring result of the communication state between the first computer and the other computers; and a step of determining that the communication state of the network is normal when determining the communication with the other computers is possible.

13. The data management method according to claim 10, wherein the first computer is configured to:

execute a process for a service via the network; and periodically monitor an operating state of the process; and wherein the step of determining whether or not a communication state of the network is normal comprises:

a step of determine whether or not the process is normally operating by referring to a monitoring result on the operating state of the process; and a step of determine that the communication state of the network is normal when determining the process is normally operating.

14. The data management method according to claim 8, wherein the database stores pieces of data each composed of a key and a data value, wherein each of the plurality of computers manages data sets in a predetermined key range, and wherein the first computer manages data sets in a first key range and stores replicated data of the data included in data sets in a predetermined key range managed by the other computers.

15. A non-transitory computer-readable medium having a data management program executed in a plurality of computers connected via a network configured to carry out a task using a database including storage areas of the plurality of computers, wherein each of the plurality of computers is configured to:

include a processor, a memory connected to the processor, and a network interface connected to the processor and configured to communicate with other computers via the network; and manage a data set including piece of data;

the program, when executed on a computer of the plurality of computers, causes the processor to perform the steps of:

storing replicated data of data included in data sets managed by the other computers;

storing, new first data in the memory upon receiving a storage request for the first data;

replicating the first data to generate first replicated data;

transmitting the generated first replicated data to the other computers;

determining whether or not the first replicated data has been transmitted to the network;

carrying out a task using the first data when determining that the first replicated data has been transmitted to the network;

determining whether or not the first replicated data has been stored in the other computers; and transmitting the replicated data of the first data again to the other computers unless the first replicated data has been stored in the other computers;

wherein the computer includes a counter for measuring at least one of a number of successes and a number of failures in a storage processing of the replicated data in the other computers, storing new second data in the memory upon receiving a storage request for the second data;

replicating the second data to generate second replicated data;

calculating a success probability of the storage processing of the replicated data based on a value of the counter;

determining a transmission number of the second replicated data based on the calculated success probability; and transmitting the generated second replicated data as many times as the determined transmission number.

16. The non-transitory computer-readable medium to claim 15, wherein, in determining whether or not the first replicated data has been transmitted to the network, the processor is caused to perform at least one of:

determining whether or not the multicast notification including the first data has been received from a network device included in the network, determining whether or not communication with the other computers is possible and determining whether not a process for a service via the network is normally operating.

* * * * *